(12) United States Patent
Taki

(10) Patent No.: US 10,409,390 B2
(45) Date of Patent: Sep. 10, 2019

(54) DISPLAY DEVICE AND METHOD FOR CONTROLLING DISPLAY DEVICE

(71) Applicant: KYOCERA Document Solutions Inc., Osaka (JP)

(72) Inventor: Kosuke Taki, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 106 days.

(21) Appl. No.: 15/641,587

(22) Filed: Jul. 5, 2017

(65) Prior Publication Data

US 2018/0032148 A1    Feb. 1, 2018

(30) Foreign Application Priority Data

Jul. 28, 2016    (JP) .................................. 2016-148960

(51) Int. Cl.
| | |
|---|---|
| *G06F 3/023* | (2006.01) |
| *G06F 17/27* | (2006.01) |
| *H04N 1/44* | (2006.01) |
| *H04N 1/00* | (2006.01) |
| *G06F 17/22* | (2006.01) |
| *G06F 17/24* | (2006.01) |

(Continued)

(52) U.S. Cl.
CPC ............ *G06F 3/0236* (2013.01); *G06F 3/018* (2013.01); *G06F 3/0237* (2013.01); *G06F 3/04886* (2013.01); *G06F 17/2223* (2013.01); *G06F 17/24* (2013.01); *G06F 17/276* (2013.01); *H04N 1/00384* (2013.01); *H04N 1/00392* (2013.01); *H04N 1/00408* (2013.01); *H04N 1/4413* (2013.01); *H04N 2201/0094* (2013.01)

(58) Field of Classification Search
CPC ...... G06F 3/0236; G06F 3/018; G06F 3/0237; G06F 3/04886; G06F 17/2223; G06F 17/24; G06F 17/276; H04N 1/00384; H04N 1/00392; H04N 1/00408; H04N 1/4413; H04N 2201/0094
See application file for complete search history.

(56) References Cited

U.S. PATENT DOCUMENTS 8,712,931 B1 * 4/2014 Wahlen ................. G06F 3/0237
706/12
2006/0101078 A1 * 5/2006 Tashiro ............... G06F 21/6245
(Continued)

FOREIGN PATENT DOCUMENTS

JP    2014-068262 A    4/2014

*Primary Examiner* — Tadesse Hailu
*Assistant Examiner* — Darrin Hope
(74) *Attorney, Agent, or Firm* — IP Business Solutions, LLC

(57) ABSTRACT

A display device includes a display section, a display control section, an acceptance section, and a storage section. The display control section allows the display section to display an input screen including a plurality of character input fields. When all characters displayed in a character input field designated as a character input destination are deleted by a sequence of character deletion operations, the display control section allows the storage section to store the deleted characters. Then, when the acceptance section accepts an operation for canceling designation of the character input field as the character input destination, the display control section allows the display section to display, in another of the plurality of character input fields, the characters stored in the storage section.

13 Claims, 14 Drawing Sheets

(51) Int. Cl.
   *G06F 3/01*      (2006.01)
   *G06F 3/0488*    (2013.01)

(56) References Cited

U.S. PATENT DOCUMENTS

2013/0326392 A1* 12/2013 Maltesson .............. G06F 3/0488
                                                    715/780
2016/0219169 A1*  7/2016 Sato ................... H04N 1/00411

\* cited by examiner

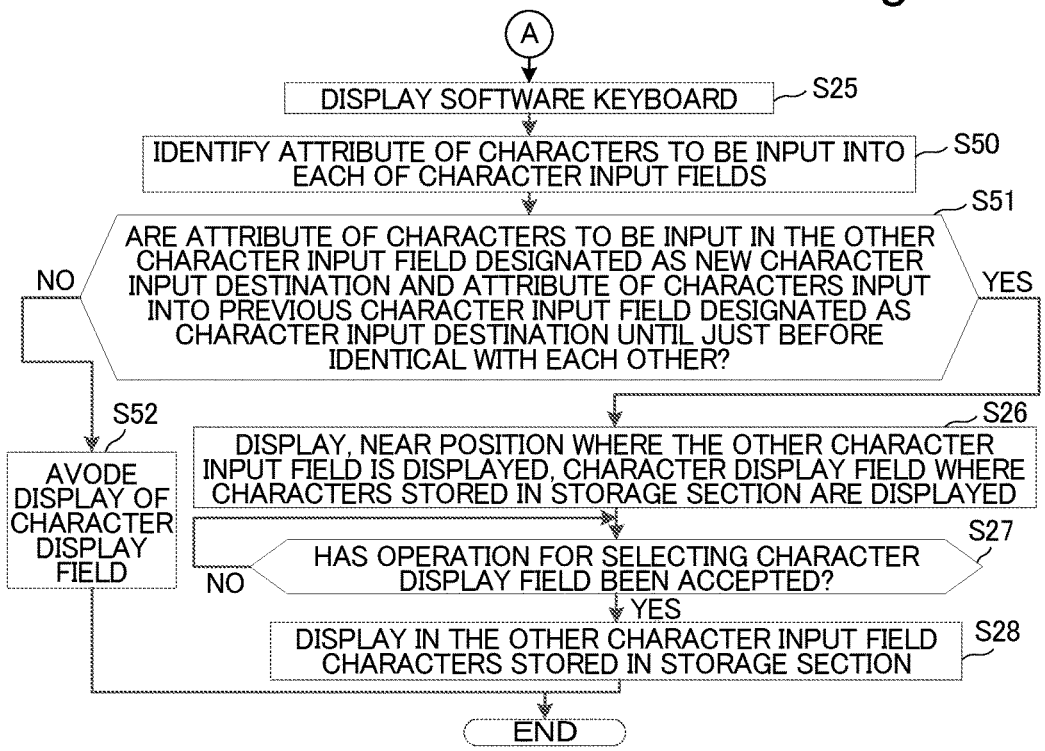

DISPLAY DEVICE AND METHOD FOR CONTROLLING DISPLAY DEVICE

INCORPORATION BY REFERENCE

This application claims priority to Japanese Patent Application No. 2016-148960 filed on 28 Jul. 2016, the entire contents of which are incorporated by reference herein.

BACKGROUND

The present disclosure relates to a display device that displays an input screen including a plurality of character input fields and a method for controlling a display device.

Information processing apparatuses, such as a multifunction peripheral, accept input of various types of information (characters), including a user ID and a password, from a user and performs various operations based on the accepted information. Such an information processing apparatus generally includes a display section, such as a liquid crystal display, and displays on the display section an input screen including a plurality of character input fields for use in accepting characters. By inputting characters into the plurality of character input fields displayed on the input screen, a user can get the information processing apparatus to perform a desired operation.

SUMMARY

A technique improved over the aforementioned technique is proposed as one aspect of the present disclosure.

A display device according to an aspect of the present disclosure includes a display section, a display control section, an acceptance section, and a storage section. The display control section controls a display operation of the display section. The acceptance section accepts an operation associated with a screen displayed by the display section. Furthermore, the display control section: (1) allows the display section to display an input screen including a plurality of character input fields; (2) designates, when the acceptance section accepts an operation for specifying one of the plurality of character input fields, the specified one character input field as a character input destination where a character is to be input when the acceptance section accepts a character input operation; (3) allows, when the acceptance section accepts the character input operation, the display section to display a character indicated by the character input operation in the character input field designated as the character input destination; (4) allows, when the acceptance section accepts a character deletion operation for deleting a character displayed in the character input field, the display section to clear, according to the character deletion operation, a display of the character in the character input field designated as the character input destination; (5) allows, when the acceptance section accepts a sequence of the character deletion operations and all characters displayed in the character input field designated as the character input destination are deleted by the accepted sequence of the character deletion operations, the storage section to store the deleted characters; and (6) allows, when the acceptance section accepts an operation for canceling designation of the character input field as the character input destination, the display section to display, in another of the plurality of character input fields, the characters stored in the storage section.

A method for controlling a display device according to another aspect of the present disclosure is a method for controlling a display device including a display section, a display control section that controls a display operation of the display section, an acceptance section that accepts an operation associated with a screen displayed by the display section, and a storage section, and the method includes: (1) the step that the display control section allows the display section to display an input screen including a plurality of character input fields; (2) the step that, when the acceptance section accepts an operation for specifying one of the plurality of character input fields, the display control section designates the specified one character input field as a character input destination where a character is to be input when the acceptance section accepts a character input operation; (3) the step that, when the acceptance section accepts the character input operation, the display control section allows the display section to display a character indicated by the character input operation in the character input field designated as the character input destination; (4) the step that, when the acceptance section accepts a character deletion operation for deleting a character displayed in the character input field, the display control section allows the display section to clear, according to the character deletion operation, a display of the character in the character input field designated as the character input destination; (5) the step that, when the acceptance section accepts a sequence of the character deletion operations and all characters displayed in the character input field designated as the character input destination are deleted by the accepted sequence of the character deletion operations, the display control section allows the storage section to store the deleted characters; and (6) the step that, when the acceptance section accepts an operation for canceling designation of the character input field as the character input destination, the display control section allows the display section to display, in another of the plurality of character input fields, the characters stored in the storage section.

BRIEF DESCRIPTION OF THE DRAWINGS

FIGS. 11A and 11B are flowcharts showing an operation flow of a display device according to Modification 3.

DETAILED DESCRIPTION

Figure 1:
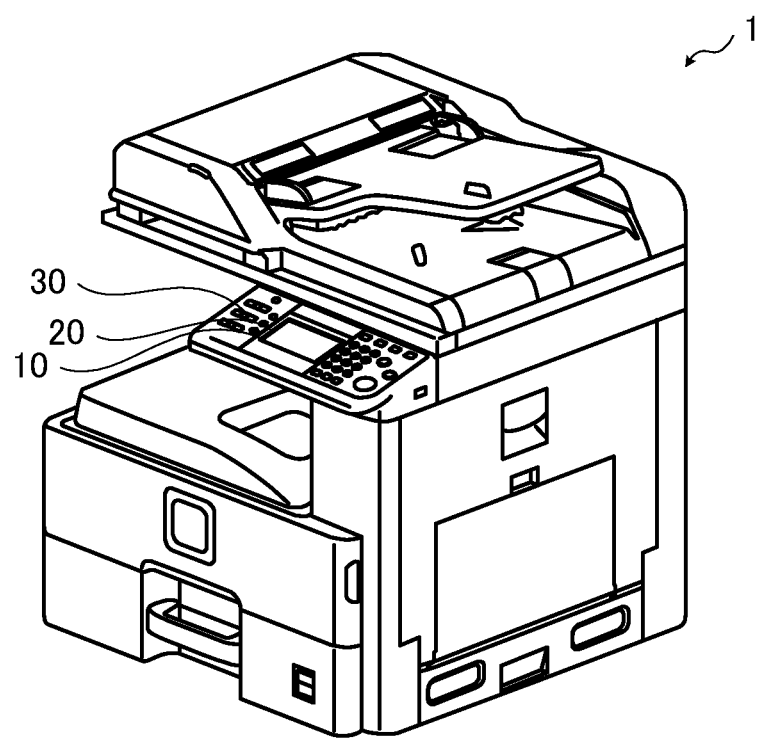
FIG. 1 is a perspective view showing an image forming apparatus including a display device according to one embodiment of the present disclosure.
Figure 2:
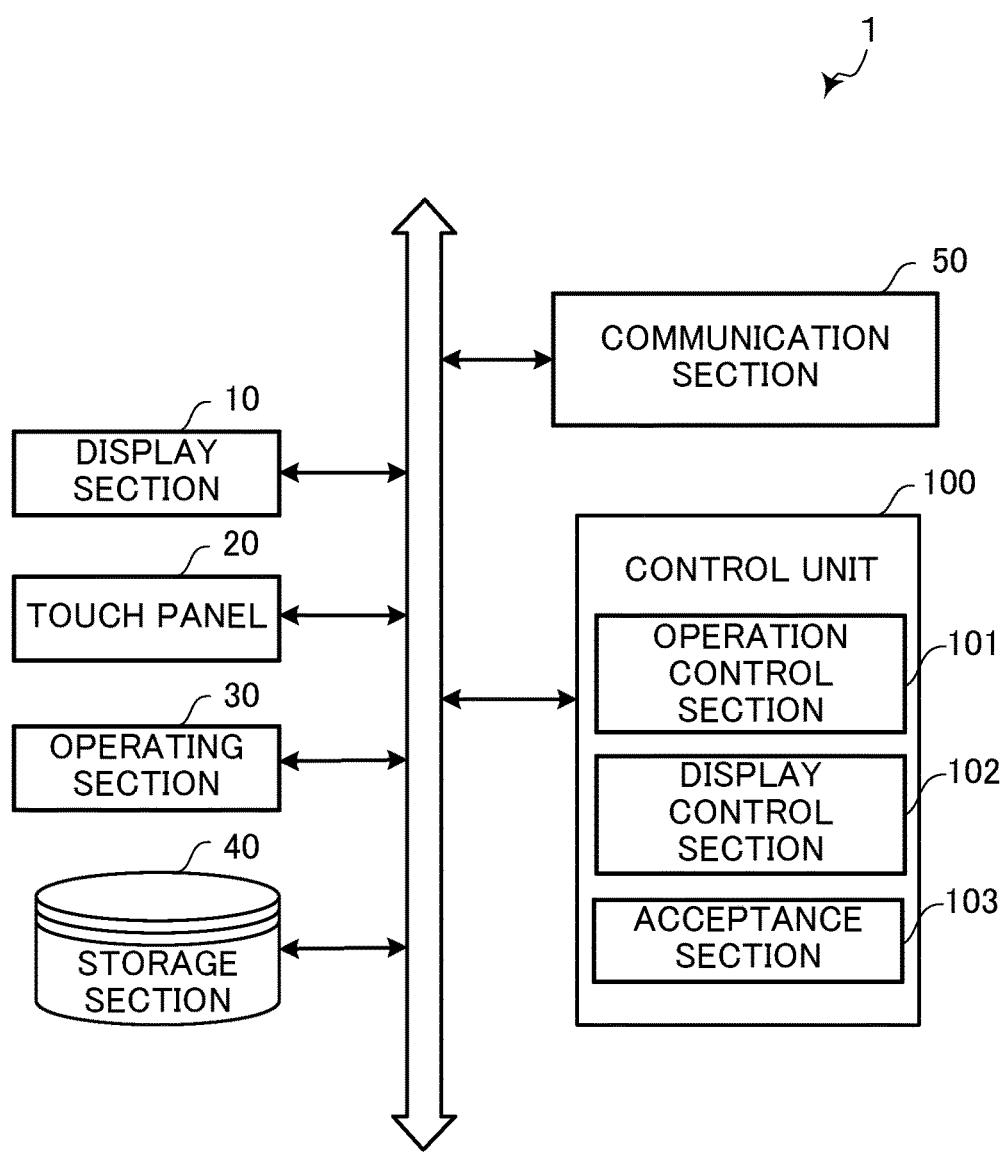
FIG. 2 is a block diagram showing an internal configuration of the image forming apparatus including the display device according to the one embodiment of the present disclosure.

Hereinafter, a description will be given of a display device and a method for controlling a display device, both according to one embodiment of the present disclosure with reference to the drawings. FIG. 1 is a perspective view showing an image forming apparatus including the display device according to the one embodiment of the present disclosure. FIG. 2 is a block diagram showing an internal configuration of the image forming apparatus.

The image forming apparatus 1 is a multifunction peripheral having multiple functions including, for example, a copy function, a print function, a scan function, and a facsimile function. In order to accept input of various types of information (characters), including a user ID and a password, from a user, the image forming apparatus 1 include a display section 10 and an operating section 30, both provided at the front of a housing forming a shell of the image forming apparatus 1.

The display section 10 is formed to include a liquid crystal display (LCD) or an organic light-emitting diode (OLED) display. The display section 10 displays, under the control of a display control section 102 to be described hereinafter, various display screens.

A touch panel 20 is disposed in front of the display section 10. The touch panel 20 is a touch panel of, for example, a so-called resistive film system or a capacitance system and detects a user's touch of the touch panel 20 together with the point of touch. When detecting the user's touch, the touch panel 20 outputs a signal indicating a coordinate point of the point of touch to a hereinafter described acceptance section 103 and so on.

The operating section 30 is hard keys including, for example, a display key for calling up a display screen, arrow keys for moving the focus of a GUI forming the display screen, a determination key for performing a determination operation for the GUI forming the display screen, and so on.

A storage section 40 is a storage device, such as an HDD (hard disk drive).

A communication section 50 is a network interface composed of a communication module, such as a wireless LAN board.

The control unit 100 is composed of a CPU (central processing unit), a RAM (random access memory), a ROM (read only memory), and so on. When a display control program stored in the above ROM or the storage section 40 is executed by the above CPU, the control unit 100 functions as an operation control section 101, a display control section 102, and an acceptance section 103. Alternatively, each of the sections of the control unit 100 may not be implemented by the operation of the control unit 100 in accordance with the display control program but may be constituted by a hardware circuit.

The operation control section 101 governs the overall operation control of the image forming apparatus 1. For example, the operation control section 101 controls an image forming operation of an unshown image forming section including a charging device, an exposure device, and a developing device and controls a communication operation of the communication section 50 to send and receive data to and from external information processing apparatuses, such as PCs (personal computers).

Figure 3:
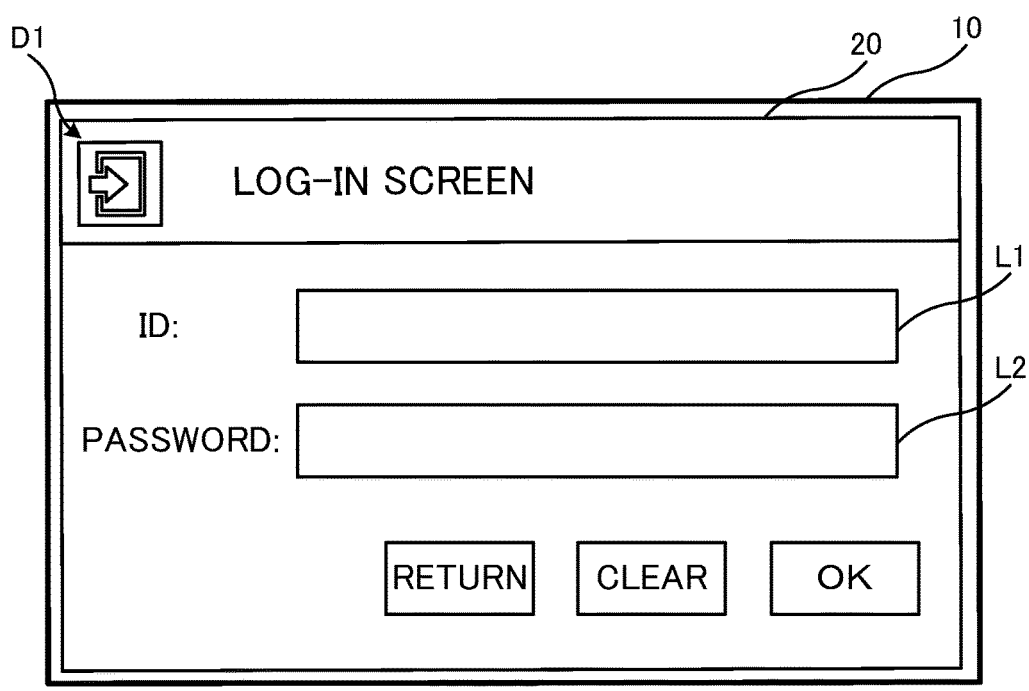
FIG. 3 shows an exemplary display screen displayed on a display section of the display device according to the one embodiment of the present disclosure.

The display control section 102 has the function of controlling the display operation of the display section 10. FIG. 3 shows an exemplary display screen displayed on the display section 10. In an example shown in this figure, the display section 10 displays an input screen D1 that includes a character input field L1 for accepting input of an ID and a character input field L2 for accepting input of a password.

The acceptance section 103 has the function of accepting an operation (instruction) corresponding to a touch gesture on the touch panel 20 or a press on any hard key of the operating section 30.

Figure 4:
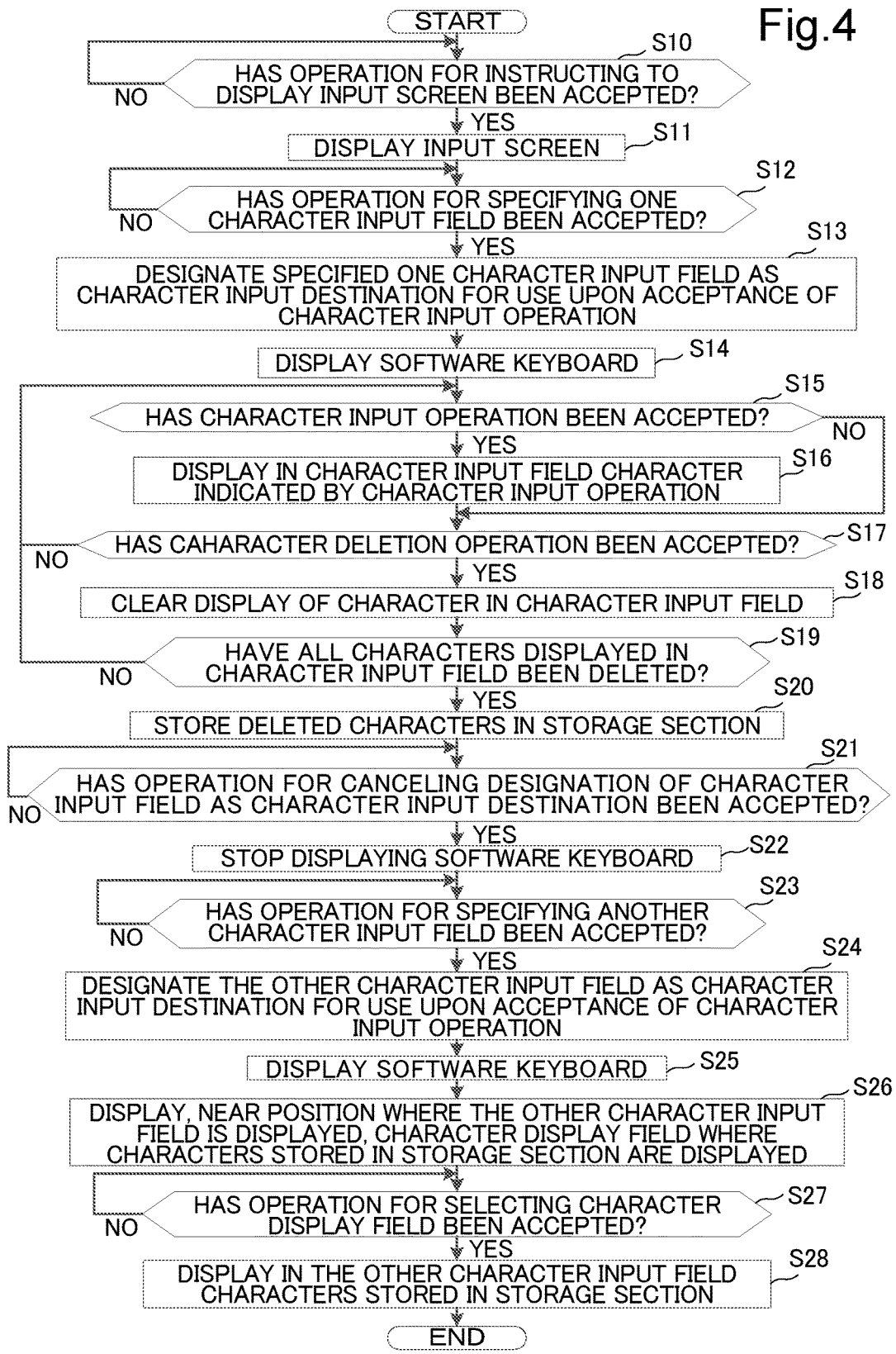
FIG. 4 is a flowchart showing an operation flow of the display device according to the one embodiment of the present disclosure.

Next, a description will be given of the operation of the display device included in the image forming apparatus 1 having the above-described configurations. FIG. 4 is a flowchart showing an operation flow of the display device.

When the acceptance section 103 accepts an operation for instructing to display an input screen by a touch gesture on the touch panel 20 or a press on a hard key of the operating section 30 (YES in step S10), the display control section 102 allows the display section 10 to display an input screen D1 (see FIG. 3) (step S11).

When one character input field on the input screen D1 is selected by an operation, such as a touch gesture on the touch panel 20 or a press on a hard key of the operating section 30, the acceptance section 103 accepts this operation as an operation for specifying the one character input field (step S12). Then, the display control section 102 designates the one character input field specified in the processing in step S12 as a character input destination where one or more characters are to be input upon acceptance of a character input operation (step S13) and then allows the display section 10 to display a software keyboard for use in inputting characters to the character input field designated as the character input destination (step S14).

Figure 5A:
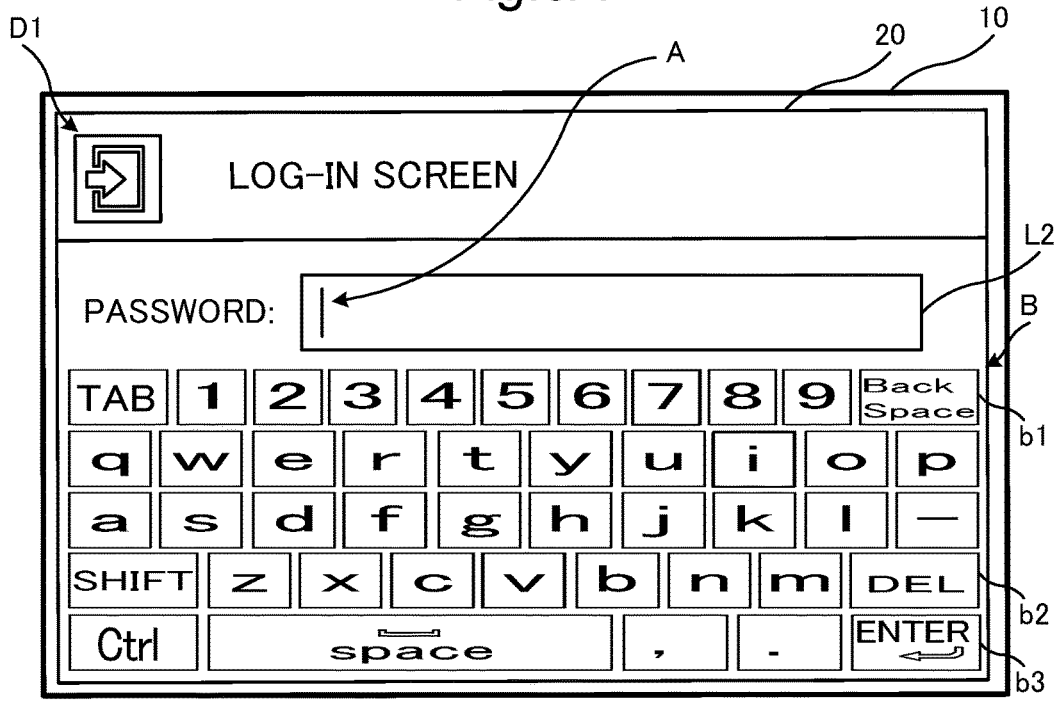
FIGS. 5A and 5B show exemplary display screens displayed on the display section of the display device according to the one embodiment of the present disclosure.

FIG. 5A shows a screen display displayed on the input screen D1 shown in FIG. 3 when the character input field L2 is selected by a touch gesture on the touch panel 20 or a press on a hard key of the operating section 30. In this case, the character input field L2 is designated as a character input destination by the display control section 102 and an input cursor A indicating a position where a character is to be input is displayed in the character input field L2.

Referring back to FIG. 4, when the acceptance section 103 accepts a character input operation using the software keyboard, for example, by a touch gesture on the touch panel 20 (YES in step S15), the display control section 102 allows the display section 10 to display, in the character input field, a character indicated by the character input operation (step S16).

Furthermore, when the acceptance section 103 accepts a character deletion operation using the software keyboard, for example, by a touch gesture on the touch panel 20 (YES in step S17), the display control section 102 allows the display section 10 to clear the display of a character being displayed in the character input field (step S18).

In this manner, the user can input desired characters in a desired character input field according to an operation for selecting a character input field, a character input operation, and a character deletion operation shown in the above steps S12 to S18.

Figure 5B:
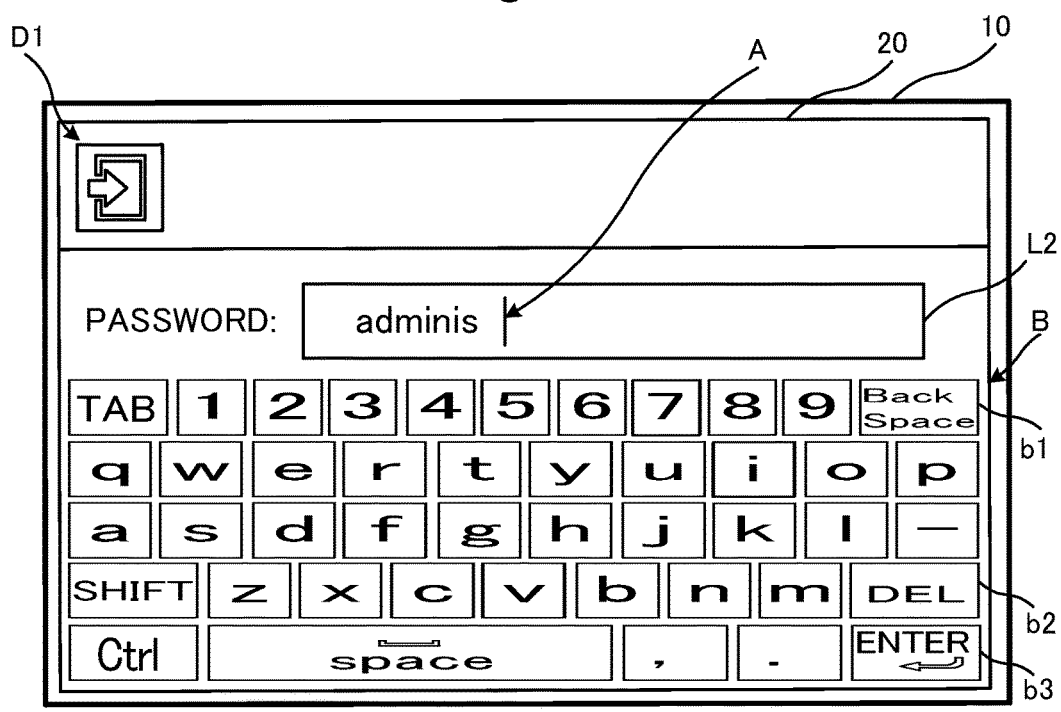

In doing so, there are cases where the user selects a wrong character input field and inputs characters in the wrongly selected character input field. An example shown in FIG. 5B shows a case where although the character input field to be normally selected by the user is a character input field L1 for inputting an ID, the user has wrongly selected a character input field L2 for inputting a password and has input thereinto some characters "adminis" in a word "administrator" that should be input in the character input field L1. When, after inputting the characters "adminis", the user becomes aware of inputting of the characters into a wrong character input field, a general display device requires the user to delete all the input characters "adminis", then select the character input field L1 for inputting an ID, and re-input a string of characters "administrator" into the character input field L1. As seen from this, in the general display device, it is necessary for the user to input already input characters again, which is user-unfriendly.

More specifically, in a general display device, there are cases where instead of inputting characters in a certain character input field, the user wrongly inputs the characters in a different character input field. For example, the user may input a password into a character input field where a user ID should be input. In this case, when becoming aware of an input error, the user needs to press down on a Back Space key multiple times to delete all the input characters, then select a correct character input field, and input characters again. As just described, in the general display device, it is necessary for the user to input already input characters again, which is user-unfriendly.

Unlike the above, when, in the display device according to the one embodiment of the present disclosure, the user selects a wrong character input field and inputs characters in the wrongly selected character input field, the display device performs the following processing in order to save the user the trouble of inputting already input characters again.

Referring back to FIG. 4, when the acceptance section 103 accepts a sequence of character deletion operations and all the characters displayed in the character input field designated as the character input destination are deleted by the accepted sequence of character deletion operations (YES in step S19), the display control section 102 allows the storage section 40 to store the deleted characters (step S20).

In the example shown in FIG. 5B, when, after inputting the characters "adminis", the user becomes aware of inputting of the characters into a wrong character input field and successively presses down on a Back Space key b1 or a DEL key b2 several times to delete all the characters "adminis", the display control section 102 allows the storage section 40 to store the characters "adminis".

Referring back to FIG. 4, when, after the processing in step S20, the acceptance section 103 accepts an operation for canceling the designation of the character input field as the character input destination (YES in step S21), the display control section 102 allows the display section 10 to stop displaying the software keyboard (step S22). An example of the operation for canceling the designation as the character input destination is a touch gesture on an Enter key b3 or a dedicated key on the software keyboard B. When in the screen display shown in FIG. 5A the designation of the character input field L2 as the character input destination is canceled, the screen display displayed by the display section 10 returns to the screen display of the input screen D1 shown in FIG. 3. As just described, in this embodiment, when the acceptance section 103 accepts an operation for canceling the designation of the character input field as the character input destination, the display control section 102 allows the display section 10 to display an input screen including a plurality of character input fields. Therefore, in this embodiment, the user can smoothly input characters into a desired character input field.

When, after the processing in step S22, the acceptance section 103 accepts an operation for specifying another character input field different from the character input field previously designated as the character input destination in the processing in step S13 (YES in step S23), the display control section 102 designates the specified other character input field as the character input destination (step S24) and allows the display section 10 to display the software keyboard (step S25). Then, the display control section 102 allows the display section 10 to display a character display field where the characters stored in the storage section 40 are displayed, near the position where the other character input field is displayed (i.e., at a predetermined distance from the other character input field) (step S26).

Figure 6:
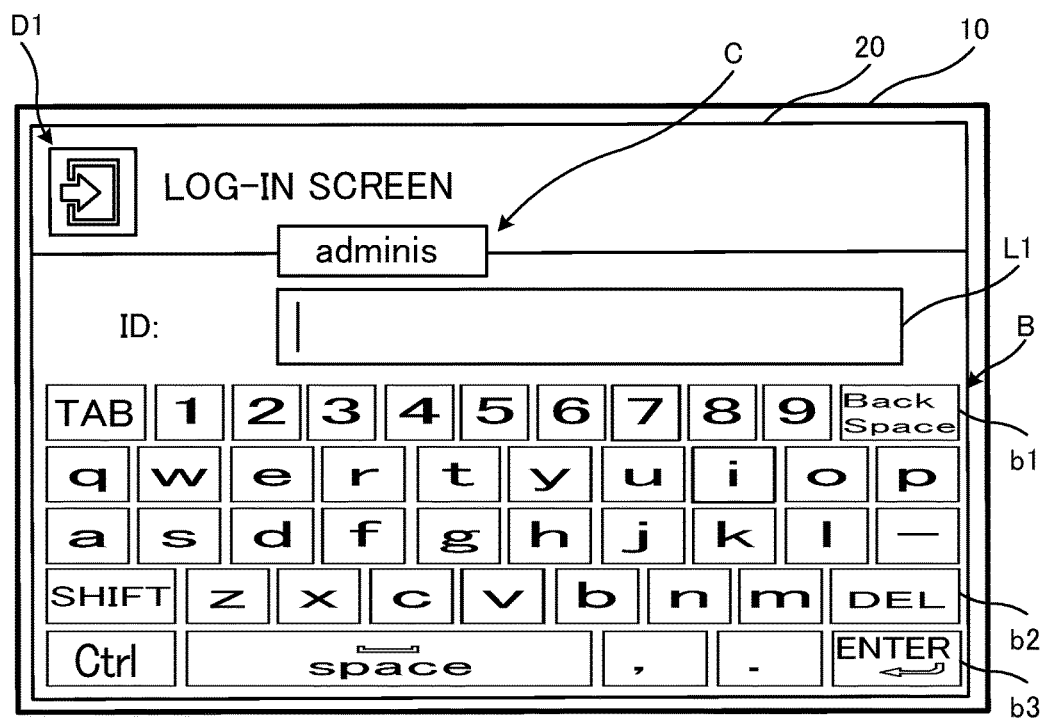
FIG. 6 shows an exemplary display screen displayed on the display section of the display device according to the one embodiment of the present disclosure.

In an example shown in FIG. 6, the character input field L1 different from the character input field L2 designated as the character input destination in the examples shown in FIGS. 5A and 5B is designated as the character input destination. Furthermore, displayed above the character input field L2 is a character display field C in which the characters "adminis" stored in the storage section 40 and previously wrongly input into the character input field L1 by the user are displayed.

Referring back to FIG. 4, when the acceptance section 103 accepts an operation for selecting the character display field (YES in step S27), the display control section 102 allows the display section 10 to display, in the character input field, the characters contained in the selected character display field (step S28).

In the example shown in FIG. 6, when the user makes an operation for selecting the character display field C, the characters "adminis" are inserted into the character input field L1. The user can complete the input of an ID "administrator" simply by inputting, following the characters "adminis" inserted into the character input field L1, characters "trator" which is the rest of the ID. Therefore, the display device according to this embodiment can save the user the trouble of inputting previously input characters again.

Alternatively, it is also possible to skip the processing for displaying the character display field in step S26 and insert the characters stored in the storage section 40 into the other character input field at the time when the other character input field is designated as a new character input destination.

The present disclosure is not limited to the configuration of the above embodiment and can be modified in various ways.

<Modification 1>

Figure 7:
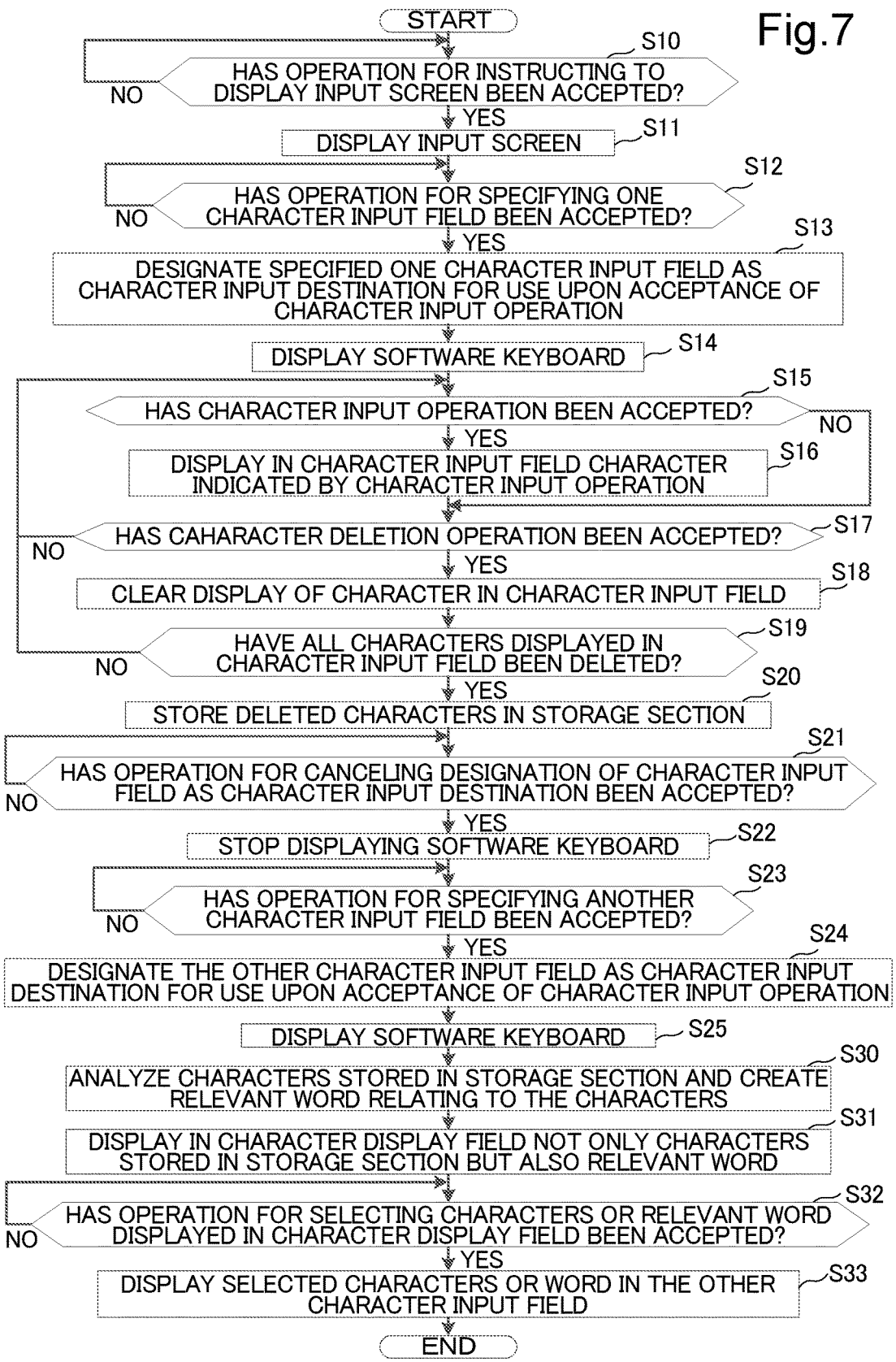
FIG. 7 is a flowchart showing an operation flow of a display device according to Modification 1.

FIG. 7 is a flowchart showing an operation flow of a display device according to Modification 1. The same steps of processing as those in the flowchart shown in FIG. 4 are designated by the same references and further explanation thereof will be omitted.

In the display device according to Modification 1, after the processing in steps S25, the display control section 102 analyzes the characters stored in the storage section 40 and creates a relevant word relating to the stored characters (step S30). For example, the display control section 102 creates, as a relevant word, a word in which a part of the stored characters is deleted. When the characters "adminis" are stored in the storage section 40, the display control section 102 may create, as a relevant word, a word "admini" in which the last character of the characters "adminis" is deleted. Furthermore, the display control section 102 may create, as a relevant word, a word "admin" in which the last two characters of the characters "adminis" are deleted.

Figure 8:
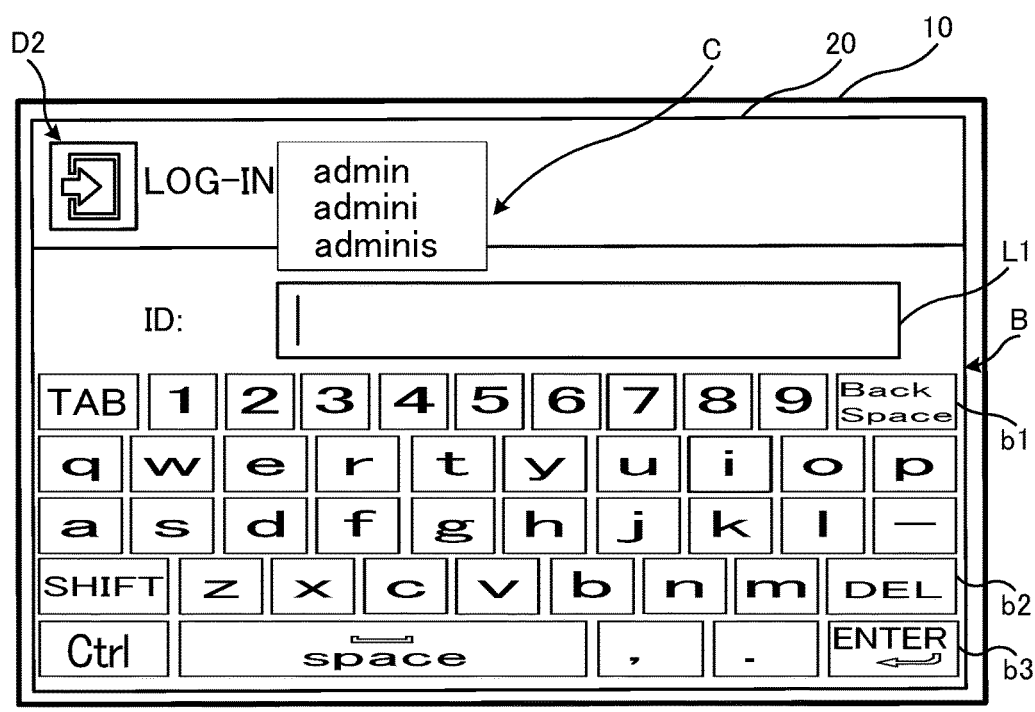
FIG. 8 shows an exemplary display screen displayed on a display section of the display device according to Modification 1.

The display control section 102 allows the display section 10 to display, in the character display field, not only the characters stored in the storage section 40 but also one or more relevant words created in the processing in step S30 (step S31). In an example shown in FIG. 8, the display section 10 displays, in addition to the characters "adminis", the words "admini" and "admin" as relevant words in the character display field C.

When the acceptance section 103 accepts an operation for selecting the characters or the relevant word displayed in the character display field (YES in step S32), the display control section 102 allows the display section 10 to display the selected characters or word in the other character input field (step S33).

As thus far described, the display device according Modification 1 can save the trouble of inputting not only characters input into the wrongly selected character input field but also relevant words relating to the characters into a new character input field.

If the storage section 40 holds a plurality of words input into the character input field before, the display control section 102 may identify, from among the words input before, a word partly matching the characters just stored in the storage section 40 and create the identified word as a relevant word. For example, if the storage section 40 holds the word "administrator" as a word input into the character input field L1 before, the display control section 102 may display the word "administrator" in the character display field.

<Modification 2>

Figure 9:
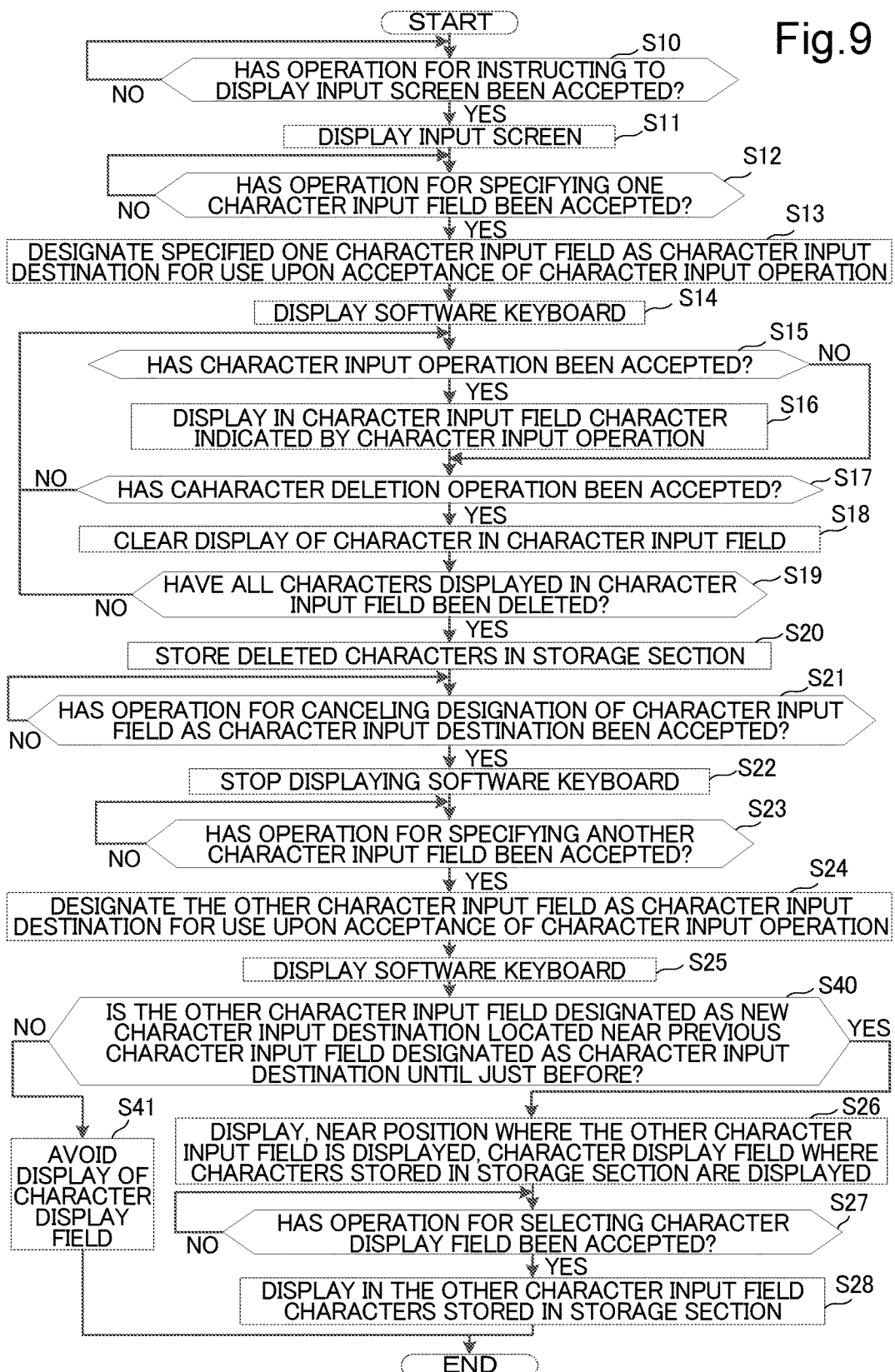
FIG. 9 is a flowchart showing an operation flow of a display device according to Modification 2.

FIG. 9 is a flowchart showing an operation flow of a display device according to Modification 2. The same steps of processing as those in the flowchart shown in FIG. 4 are designated by the same references and further explanation thereof will be omitted.

In the display device according to Modification 2, after the processing in steps S25, the display control section 102 determines whether or not the other character input field designated as a new character input destination is located near the previous character input field designated as a character input destination until just before (step S40). Specifically, the display control section 102 calculates the length (distance) between the position of the other character input field designated as a new character input destination and the previous character input field designated as a character input destination until just before. If the calculated length is equal to or smaller than a predetermined length, the display control section 102 determines that the other character input field is located near the previous character input field. If the calculated length is longer than the predetermined length, the display control section 102 determines that the other character input field is located far from the previous character input field. Then, if the other character input field is located near the previous character input field designated as a character input destination until just before (YES in step S40), the display control section 102 performs the processing in steps S26 to S28 to allow the display section 10 to display the character display field and insert into the other character input field the characters stored in the storage section 40.

On the other hand, if the other character input field is located far from the previous character input field designated as a character input destination until just before (NO in step S40), the display control section 102 prevents the display section 10 from displaying the character display field (step S41) and avoids the processing for inserting into the other character input field the characters stored in the storage section 40.

Figure 10:
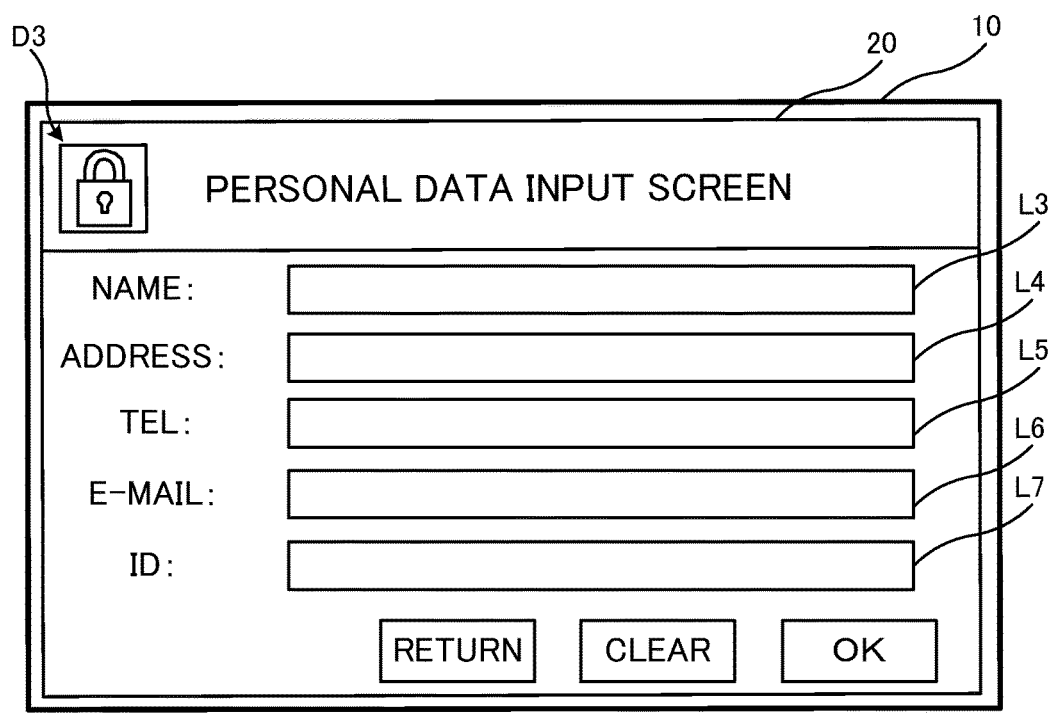
FIG. 10 shows an exemplary display screen displayed on a display section of the display device according to Modification 2.

FIG. 10 shows an example of an input screen displayed by the display section 10. An input screen D3 shown in FIG. 10 includes five character input fields L3 to L7. For example, when the character input destination designated until just before is the character input field L3 and a new character input destination is the character input field L6, both the character input fields are not located near each other. In this case, it can be considered that the character input field L3 is less likely to have been wrongly selected by the user. Therefore, in the display device according to Modification 2, when it is less likely that the user wrongly selected a character input field, the display control section 102 prevents the display section 10 from displaying the character display field and avoids the processing for inserting into the other character input field the characters stored in the storage section 40. On the other hand, when the character input destination designated until just before is the character input field L4 and a new character input destination is the character input field L3, both the character input fields are adjacent each other. Therefore, it can be considered that the character input field L4 is likely to have been wrongly selected by the user. In this case, in the display device according to Modification 2, like the display device according to the above embodiment, the display control section 102 allows the display section 10 to display the character display field and inserts into the other character input field the characters stored in the storage section 40.

<Modification 3>

Figure 11A:
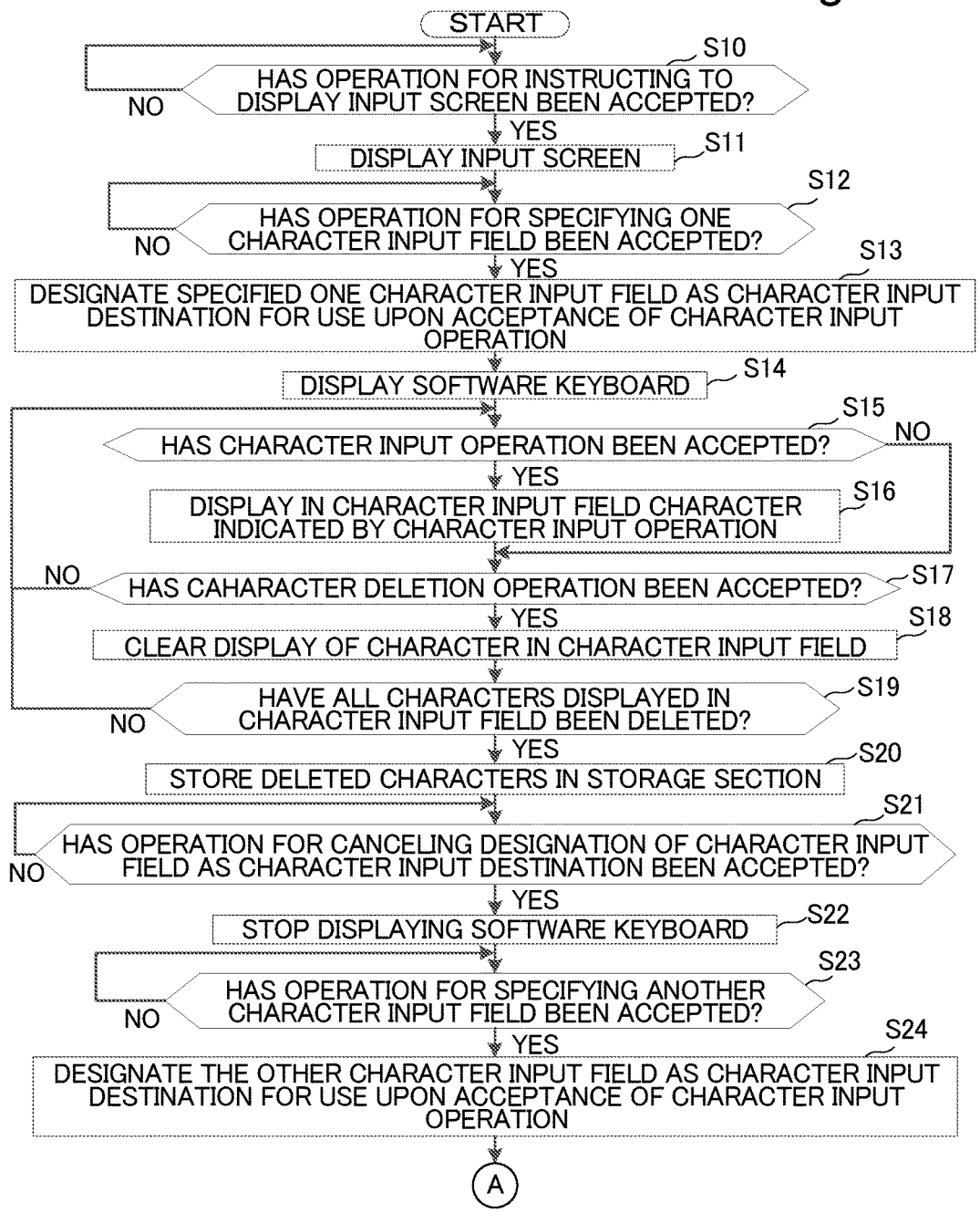

FIGS. 11A and 11B are flowcharts showing an operation flow of a display device according to Modification 3. The same steps of processing as those in the flowchart shown in FIG. 4 are designated by the same references and further explanation thereof will be omitted.

In the display device according to Modification 3, after the processing in steps S25, the display control section 102 identifies the attribute of characters to be input into each of the plurality of character input fields arranged on the input screen (step S50). The attribute of characters means the type of characters (such as single-byte numeric character, single-byte alphabetical character, numeric character, hiragana, katakana or kanji) representing information to be input into the character input field. In the example shown in FIG. 10, for example, the attribute of characters to be input into the character input field L7 for accepting an ID is "single-byte alphabetical character" because information on ID is normally represented by single-byte alphabetical characters. For another example, the attribute of characters to be input into the character input field L5 for accepting a telephone number is "numeric character" because information on telephone number is normally represented by numeric characters. For still another example, the attribute of characters to be input into the character input field L3 for accepting a name written in Japanese is "hiragana, kanji" because information on the name written in Japanese is normally represented by hiragana and kanji characters.

The display control section 102 determines whether or not the attribute of characters to be input into the other character input field designated as a new character input destination is identical with the attribute of the characters input into the previous character input field designated as a character input destination until just before, i.e., the attribute of the characters stored in the storage section 40 (step S51). Then, if the attribute of characters to be input into the other character input field is identical with the attribute of the characters stored in the storage section 40 (YES in step S51), the display control section 102 performs the processing in steps S26 to S28 to allow the display section 10 to display the character display field and insert into the other character input field the characters stored in the storage section 40.

On the other hand, if the attribute of characters to be input into the other character input field is different from the attribute of the characters stored in the storage section 40 (NO in step S51), the display control section 102 prevents the display section 10 from displaying the character display field (step S52) and avoids the processing for inserting into the other character input field the characters stored in the storage section 40.

In the example shown in FIG. 10, for example, when the character input destination designated until just before is the character input field L6, characters input thereinto are kanji, and a new character input destination is the character input field L7, the attribute "kanji" of the characters input into the character input field L6 is different from the attribute "single-byte alphabetical character" of characters to be input into the character input field L7. In this case, it can be considered that the character input field L6 is less likely to have been wrongly selected as a character input destination by the user. Therefore, in the display device according to Modification 3, when it is less likely that the user wrongly selected a character input field, the display control section 102 prevents the display section 10 from displaying the character display field and avoids the processing for inserting into the other character input field the characters stored in the storage section 40.

On the other hand, for example, when the character input destination designated until just before is the character input field L3, characters input thereinto are single-byte alphabetical characters, and a new character input destination is the character input field L6, the attribute "single-byte alphabetical character" of the characters input into the character input field L3 is identical with the attribute "single-byte alphabetical character" of characters to be input into the character input field L6. In this case, it can be considered that the character input field L3 is very likely to have been wrongly selected as a character input destination by the user. In this case, in the display device according to Modification 3, like the display device according to the above embodiment, the display control section 102 allows the display section 10 to display the character display field and inserts into the other character input field the characters stored in the storage section 40.

<Modification 4>

Figure 12:
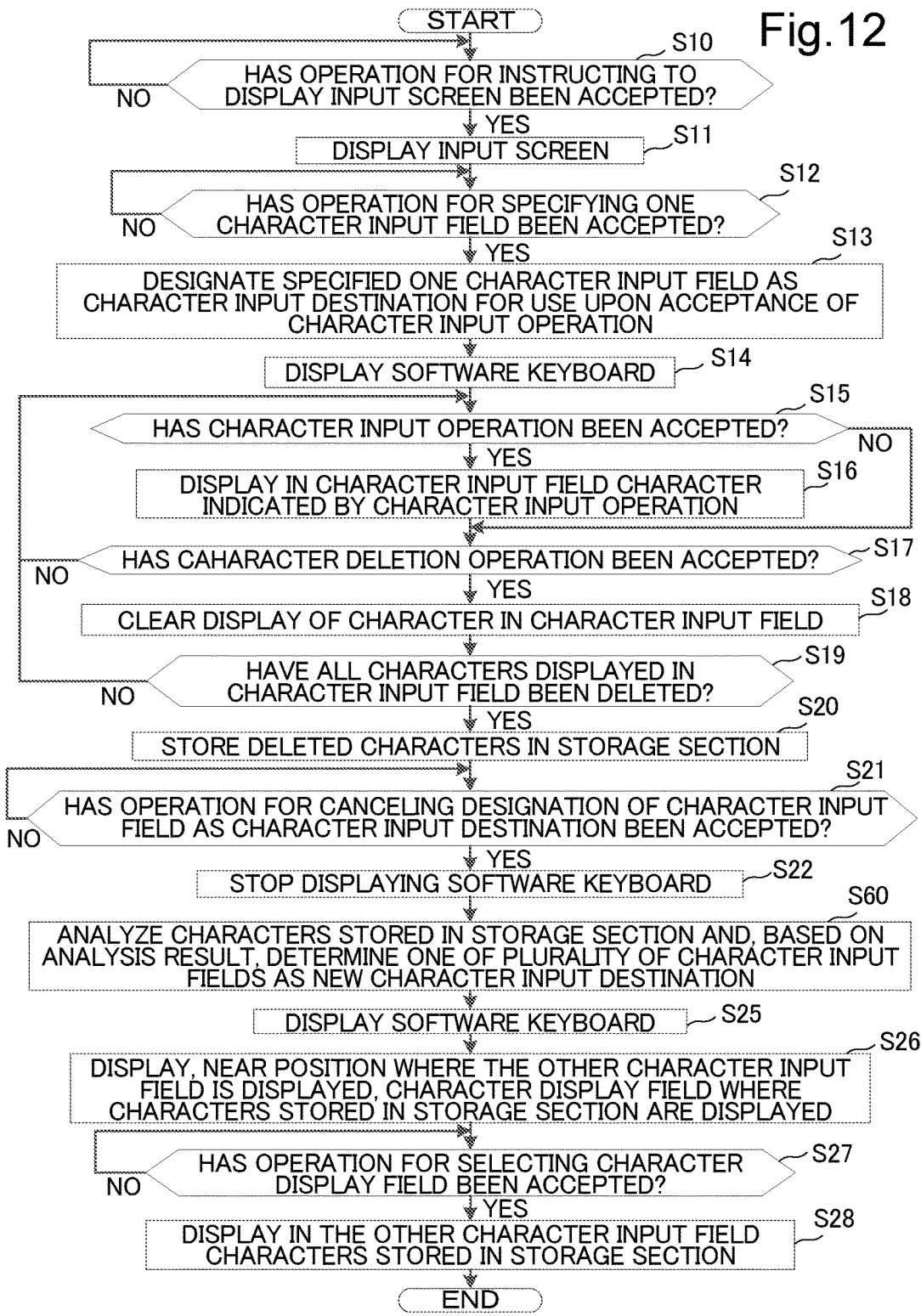
FIG. 12 is a flowchart showing an operation flow of a display device according to Modification 4.

FIG. 12 is a flowchart showing an operation flow of a display device according to Modification 4. The same steps of processing as those in the flowchart shown in FIG. 4 are designated by the same references and further explanation thereof will be omitted.

In the display device according to Modification 4, when in the processing in step S21 the acceptance section 103 accepts an operation for canceling the designation of the character input field as the character input destination, the display device itself determines a character input field serving as a new character input destination without waiting for a user's selection of a new character input destination.

Specifically, the display control section 102 makes an analysis of the characters stored in the storage section 40 and, based on a result of the analysis, determines one of the plurality of character input fields as a new character input destination (step S60). Then, the display control section 102 designates the character input field determined in the processing in step S60 as the new character input destination and performs the processing in step S25 and subsequent steps.

Figure 13A:
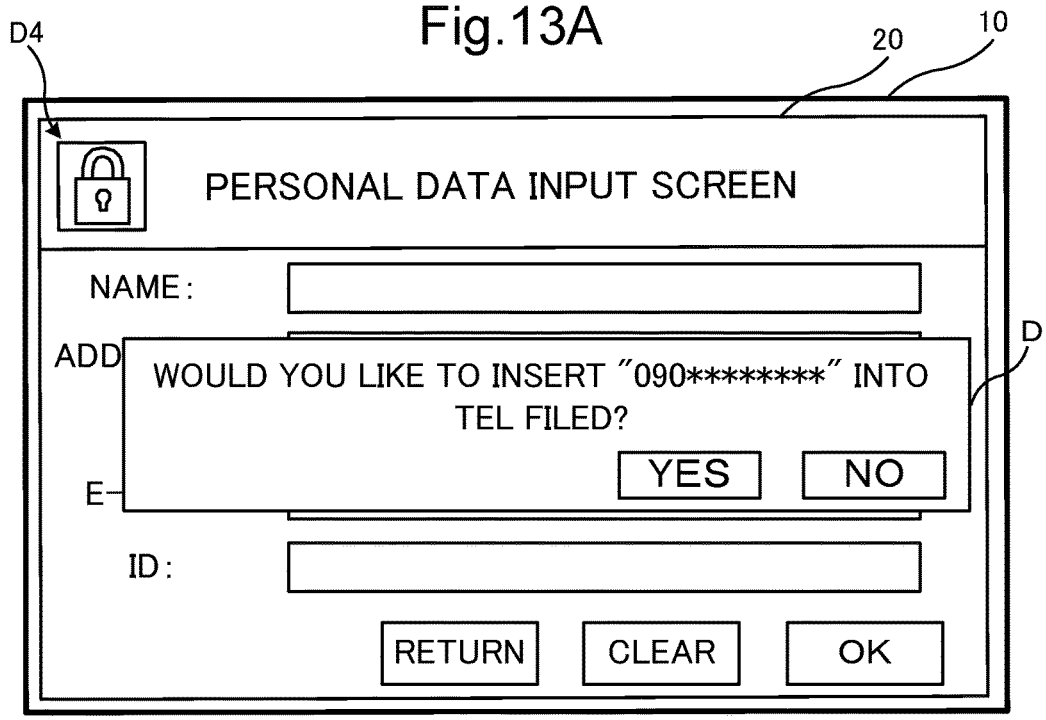
FIGS. 13A and 13B show exemplary display screens displayed on a display section of the display device according to Modification 4.

In the processing in step S60, the display control section 102 identifies the attribute of characters to be input into each of the plurality of character input fields arranged on the input screen and determines as a new character input destination, from among the plurality of character input fields, a character input field having an attribute identical with the attribute of the characters stored in the storage section 40. For example, when the attribute of the characters stored in the storage section 40 is "numeric character", the display control section 102 determines, as a new character input destination, the character input field L5 for accepting a telephone number having an attribute of "numeric character". In this case, the display control section 102 may allow the display section 10 to display an acceptance screen D (see FIG. 13A) for accepting an instruction to insert the characters into the character input field L5 determined as a new character input destination.

Furthermore, when determining, based on the result of the analysis of the characters, a plurality of character input fields as candidates for the other character input field that may be a new character input destination, the display control section 102 allows the display section 10 to display an acceptance screen for accepting into which of the plurality of character input fields characters should be input.

Figure 13B:
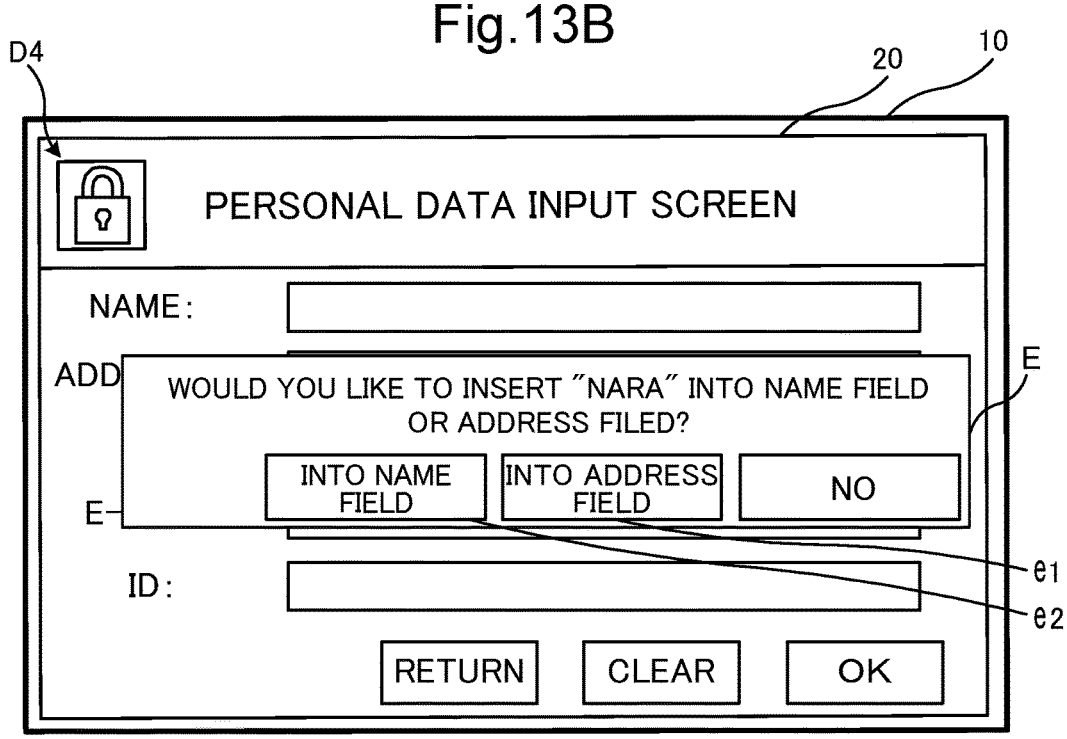

For example, when the attribute of the characters stored in the storage section 40 is "hiragana, kanji", there are a plurality of character input fields (L3 and L4) having an attribute of "hiragana, kanji". Therefore, there are a plurality of candidates for the other character input field that may be a new character input destination. In this case, the display control section 102 allows the display section 10 to display an acceptance screen E shown in FIG. 13B. Then, when the acceptance section 103 accepts a touch gesture on a button e1 disposed on the acceptance screen E, the display control section 102 inserts the characters into the character input field L3. On the other hand, when the acceptance section 103 accepts a touch gesture on a button e2 disposed on the acceptance screen E, the display control section 102 inserts the characters into the character input field L4.

As thus far described, in the display device according to Modification 4, before the user selects a character input field as a new character input destination, the display device itself determines a character input destination that the user should normally select as a character input destination. Thus, the user can be saved from the trouble of selecting a character input field serving as a new character input destination.

<Modification 5>

In relation to the display device according to Modification 4, a description has been given of the case where the other character input field serving as a new character input destination is determined based on the attribute of characters to be input into the character input field. Unlike this, a display device according to Modification 5 determines the other character input field serving as a new character input destination, based on the position of the character input field.

Specifically, the display control section 102 performs the following processing instead of the processing in step S60 in the flowchart shown in FIG. 12. The display control section 102 identifies, from among the plurality of character input fields displayed on the input screen, a character input field located nearest the character input field the designation of which as the character input destination the acceptance section 103 has accepted an operation for canceling. Then, the display control section 102 determines the identified character input field as a new character input destination. The display control section 102 designates the determined character input field as the new character input destination and performs the processing in step S25 and subsequent steps.

As thus far described, in the display device according to Modification 5, like the display device according to Modification 4, before the user selects a character input field as a new character input destination, the display device itself can determine a character input destination that the user should normally select as a character input destination. Thus, the user can be saved from the trouble of selecting a character input field serving as a new character input destination.

<Modification 6>

In relation to the display device according to Modification 4, a description has been given of the case where the other character input field serving as a new character input destination is determined based on the attribute of characters to be input into the character input field. Unlike this, a display device according to Modification 6 determines the other character input field serving as a new character input destination, based on the name of the character input field.

Specifically, the display control section 102 performs the following processing instead of the processing in step S60 in the flowchart shown in FIG. 12. The display control section 102 identifies, from among the plurality of character input fields displayed on the input screen, a character input field which is given a name having a highest degree of relevance to the name of the character input field the designation of which as the character input destination the acceptance section 103 has accepted an operation for canceling. Then, the display control section 102 determines the identified character input field as a new character input destination. The display control section 102 designates the determined character input field as the new character input destination and performs the processing in step S25 and subsequent steps.

The display control section 102 calculates the above degree of relevance based on the number of characters forming the name of the character input field. For example, as the number of characters forming the name of a character input field is nearer the number of characters forming the name of the character input field the designation of which as the character input destination the acceptance section 103 has accepted an operation for canceling, the display control section 102 assigns a higher degree of relevance to the relevant character input field.

Alternatively, the display control section 102 may calculate the above degree of relevance based on the degree of similarity in the shapes of characters. For example, when the names of both the character input fields contain their respective kanji characters having the same radical (called bushu in Japanese), the display control section 102 assigns a high degree of relevance to the relevant character input field because of a high degree of similarity in character shape. For another example, when the names of both the character input fields contain their respective characters having similar shapes (such as a pair of kanji characters "朗" and "郎" or a pair of alphabetical characters "i" and "j"), the display control section 102 assigns a high degree of relevance to the relevant character input field because of a high degree of similarity in character shape.

Still alternatively, the display control section 102 may calculate the degree of relevance based on the number of characters used in common with the name of the character input field the designation of which as the character input destination the acceptance section 103 has accepted an operation for canceling.

As thus far described, in the display device according to Modification 6, like the display device according to Modification 4, before the user selects a character input field as a new character input destination, the display device itself can determine a character input destination that the user should normally select as a character input destination. Thus, the user can be saved from the trouble of selecting a character input field serving as a new character input destination.

<Modification 7>

In a display device according to Modification 7, when the number of characters deleted by a character deletion operation is equal to or larger than a predetermined number, the display control section 102 allows the storage section 40 to store the deleted characters. On the other hand, when the number of characters deleted is smaller than the predetermined number, the display control section 102 avoids storage of the deleted characters into the storage section 40.

When the number of characters deleted is smaller than the predetermined number, it is less likely that the user wrongly selected the character input destination and even the re-input of the characters causes less trouble. Therefore, in the display device according to Modification 7, when, as a result of the above processing, it is less likely that the user selected a wrong character input destination, it is avoided to insert into a new character input destination the characters stored in the storage section 40.

Modification 8

In a display device according to Modification 8, when a predetermined period of time has passed since all the characters displayed in a character input field were deleted by character deletion operations, the display control section 102 clears the characters stored in the storage section 40. Thus, it can be avoided that the free space of the storage section 40 becomes small due to accumulation of the above character data. Furthermore, when the acceptance section 103 accepts an operation for turning off the power of the display device or a log-out operation, the display control section 102 may clear the characters stored in the storage section 40. Moreover, when the screen displayed by the display section 10 is switched from the input screen to another screen, the display control section 102 may clear the characters stored in the storage section 40.

<Other Modifications>

Although the description of the above embodiment has been given of an example where a display device according to one embodiment of the present disclosure is applied to an image forming apparatus, the example is merely illustrative and the present disclosure is not necessarily limited to this case. The display device according to the present disclosure may be applied to various industrial machines other than the image forming apparatus.

Furthermore, the display control program described in the above embodiment and modifications may be that recorded on a non-transitory computer-readable recording medium, such as a hard disk, a CD-ROM, a DVD-ROM or a semiconductor memory. In this case, the non-transitory computer-readable recording medium with the display control program recorded thereon is one embodiment of the present disclosure.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. A display device comprising:
a display;
a control unit that includes a processor and, when the processor operates in accordance with a display control program, functions as:
   a display control section that controls a display operation of the display; and
   an acceptance section that accepts an operation associated with a screen displayed by the display; and
a storage device,
the display control section:
(1) allows the display to display an input screen including a plurality of character input fields;
(2) designates, when the acceptance section accepts an operation for specifying a first character input field of the plurality of character input fields, the specified first character input field as a character input destination where a character is to be input when the acceptance section accepts a character input operation;
(3) allows, when the acceptance section accepts the character input operation, the display to display a character indicated by the character input operation in the first character input field designated as the character input destination;
(4) allows, when the acceptance section accepts a character deletion operation for deleting a character displayed in the first character input field, the display to clear, according to the character deletion operation, a display of the character in the first character input field designated as the character input destination;
(5) allows, when the acceptance section accepts a sequence of the character deletion operations and all characters displayed in the first character input field designated as the character input destination are deleted by the accepted sequence of the character deletion operations, the storage device to store all the deleted characters;
(6) allows, when the acceptance section accepts an operation for canceling designation of the first character input field as the character input destination, the display to display the input screen;
(7) designates, when the acceptance section accepts an operation for specifying a second character input field of the plurality of character input fields, the specified second character input field as the character input destination;
(8) allows, when a distance between the second character input field and the first character input field is equal to or smaller than a predetermined first length, the display to display, at a position separated by a predetermined second distance from a position where the second character input field is displayed, a character display field where the all the deleted characters stored in the storage device are displayed:
(9) allows, when the acceptance section accepts an operation for selecting the all the deleted characters displayed in the character display field, the display to display, in the second character input field, the all the deleted characters stored in the storage device; and
(10) prevents, when the distance between the second character input field and the first character input field is not equal to or smaller than the predetermined first length, the display from displaying, in the second character input field, the all the deleted characters stored in the storage device.

2. The display device according to claim 1, wherein: the display control section analyzes the all the deleted characters stored in the storage device, creates a relevant word relating to the all the deleted characters, and allows the display to display, in the character display field, not only the all the deleted characters stored in the storage device but also the relevant word; and when the acceptance section accepts an operation for selecting the relevant word displayed in the character display field, the display control section allows the display to display the relevant word in the second character input field.

3. The display device according to claim 2, wherein the display control section creates, as the relevant word, a word in which a part of the all the deleted characters stored in the storage device is deleted.

4. The display device according to claim 2, wherein
the storage device holds a plurality of words input into the second character input field before, and
the display control section creates as the relevant word, from among the plurality of words input before, a word partly matching the all the deleted characters just stored in the storage device.

5. The display device according to claim 1, wherein: the display control section identifies an attribute of characters to be input into each of the plurality of character input fields and determines whether or not the attribute of characters to be input into the second character input field designated as the character input destination and an attribute of the all the deleted characters stored in the storage device are identical with each other; when both the attributes are identical with each other, the display control section allows the display to display, in the second character input field, the all the deleted characters stored in the storage device; and when both the attributes are different from each other, the display control section prevents the display from displaying, in the second character input field, the all the deleted characters stored in the storage device.

6. The display device according to claim 1, wherein when the acceptance section accepts the operation for canceling designation of the first character input field as the character input destination, the display control section makes an analysis of the all the deleted characters stored in the storage device, determines, based on a result of the analysis, one of the plurality of character input fields as the second character input field serving as the character input destination, and allows the display to display the all the deleted characters in the determined character input field.

7. The display device according to claim 6, wherein in making the analysis of the all the deleted characters, the display control section identifies the attribute of characters to be input into each of the plurality of character input fields and determines, as the second character input field serving as the character input destination, from among the plurality of character input fields, a character input field having an attribute identical with the attribute of the all the deleted characters stored in the storage device.

8. The display device according to claim 6, wherein when determining, based on the result of the analysis of the all the deleted characters, a plurality of character input fields as candidates for the second character input field serving as the character input destination, the display control section allows the display to display an acceptance screen for accepting into which of the plurality of character input fields characters are to be input, and then allows the display to display the all the deleted characters in, from among the plurality of character input fields, a character input field a selection of which has been accepted on the acceptance screen by the acceptance section.

9. The display device according to claim 1, wherein when the acceptance section accepts the operation for canceling designation of the first character input field as the character input destination, the display control section determines, as the second character input field serving as the character input destination, from among the plurality of character input fields, a character input field located nearest the first character input field the designation of which as the character input destination the acceptance section has accepted the operation for canceling, and the display control section allows the display to display the all the deleted characters in the determined second character input field.

10. The display device according to claim 1, wherein when the acceptance section accepts the operation for canceling designation of the first character input field as the character input destination, the display control section determines, as the second character input field serving as the character input destination, from among the plurality of character input fields, a character input field given a name having a highest degree of relevance to a name of the first character input field the designation of which as the character input destination the acceptance section has accepted the operation for canceling, and the display control section allows the display to display the all the deleted characters in the determined second character input field.

11. The display device according to claim 1, wherein: when a number of characters deleted by the sequence of character deletion operations accepted by the acceptance section is equal to or larger than a predetermined number, the display control section allows the storage device to store the deleted characters; and when the number of characters deleted is smaller than the predetermined number, the display control section avoids storage of the deleted characters into the storage device.

12. The display device according to claim 1, wherein when a predetermined period of time has passed since all the characters displayed in the character input field were deleted by the character deletion operations, when the acceptance section accepts an operation for turning off power of the display device or a log-out operation or when a screen displayed by the display is switched from the input screen to second screen, the display control section clears the all the deleted characters from the storage device.

13. A method for controlling a display device including a display, a control unit that includes a processor and, when the processor operates in accordance with a display control program, functions as: a display control section that controls a display operation of the display; and an acceptance section that accepts an operation associated with a screen displayed by the display, and a storage device, the method comprising:

(1) the step that the display control section allows the display to display an input screen including a plurality of character input fields;

(2) the step that, when the acceptance section accepts an operation for specifying a first character input field of a plurality of character input fields, the display control section designates the specified first character input field as a character input destination where a character is to be input when the acceptance section accepts a character input operation;

(3) the step that, when the acceptance section accepts the character input operation, the display control section allows the display to display a character indicated by the character input operation in the first character input field designated as the character input destination;

(4) the step that, when the acceptance section accepts a character deletion operation for deleting a character displayed in the first character input field, the display control section allows the display to clear, according to the character deletion operation, a display of the character in the first character input field designated as the character input destination;

(5) the step that, when the acceptance section accepts a sequence of the character deletion operations and all characters displayed in the first character input field designated as the character input destination are deleted by the accepted sequence of the character deletion operations, the display control section allows the storage device to store all the deleted characters;

(6) the step that, when the acceptance section accepts an operation for canceling designation of the first character input field as the character input destination, the display control section allows the display to display the input screen;

(7) the step that, when the acceptance section accepts an operation for specifying a second character input field of the plurality of character input fields, the display control section designates the specified second character input field as the character input destination;

(8) the step that, when a distance between the second character input field and the first character input field is equal to or smaller than a predetermined first length, the display control section allows the display to display, at a position separated by a predetermined second distance from a position where the second character input field is displayed, a character display field where the all the deleted characters stored in the storage device are displayed:

(9) the step that, when the acceptance section accepts an operation for selecting the all the deleted characters displayed in the character display field, the display control section allows the display to display, in the second character input field, the all the deleted characters stored in the storage device; and

(10) the step that, when the distance between the second character input field and the first character input field is not equal to or smaller than the predetermined first length, the display control section prevents the display from displaying, in the second character input field, the all the deleted characters stored in the storage device.

* * * * *